United States Patent [19]

Blaicher

[11] 4,368,593

[45] Jan. 18, 1983

[54] DEVICE FOR STORAGE AND DOSED DELIVERY OF LIQUIDS

[76] Inventor: Wolfgang Blaicher, Gartenstrasse 10, 5901 Eppelheim, Fed. Rep. of Germany

[21] Appl. No.: 233,498

[22] Filed: Feb. 11, 1981

Related U.S. Application Data

[62] Division of Ser. No. 35,443, May 3, 1979, abandoned.

[30] Foreign Application Priority Data

May 11, 1978 [DE] Fed. Rep. of Germany ....... 2820540
Dec. 23, 1978 [DE] Fed. Rep. of Germany ....... 2855973

[51] Int. Cl.³ .......................... A01G 31/02; B65B 3/26
[52] U.S. Cl. ............................................ 47/59; 47/79; 137/453; 141/198; 141/311 R
[58] Field of Search ........................ 137/453; 222/353; 47/48.5, 62, 66, 59, 79; 141/1, 198, 311 R

[56] References Cited

U.S. PATENT DOCUMENTS

| 180,242 | 7/1876 | Kniest | 137/453 X |
| 224,441 | 2/1880 | Kimball | 137/453 |
| 2,375,860 | 5/1945 | Markham | 47/48.5 |

*Primary Examiner*—Frederick R. Schmidt
*Attorney, Agent, or Firm*—Fidelman, Wolffe & Waldron

[57] ABSTRACT

A device for the storage and dosed delivery of liquids, comprising a tank for containing a liquid, the tank having at least one opening for filling with the liquid and for discharge of the liquid from the tank, the tank being movably mounted in relation to a surrounding vessel so that the opening can be brought into a lower, operative, position, the liquid then passing from the tank into the surrounding vessel until the level of the liquid in said vessel reaches the level of said opening, the device then maintaining this liquid level.

8 Claims, 18 Drawing Figures

DEVICE FOR STORAGE AND DOSED DELIVERY OF LIQUIDS

This is a divisional of application Ser. No. 035,443, filed May 3, 1979, now abandoned.

The invention relates to a device for the storage and dosed delivery of liquids, in order to maintain constant a predetermined liquid level in an outer vessel.

In various arrangements, for example for the watering of plant arrangements, such as in hydroculture i.e., hydroponic, soilless, systems, or also, for example, where rotating shafts have to be wetted with liquid, it is important to ensure a uniform supply of liquid, in order to maintain constant a liquid level.

Hydroculture systems are an example of this, in which the water supply must be correctly dosed, in order to obtain healthy plants. With the known hydroculture vessels, the water reserve is relatively small and, depending on the kind and size of the growth contained therein, it must be replenished weekly, or frequently even more often. Also, attention always has to be given as to whether too much or too little water is supplied. For individual plants, vessels are known in which an outer vessel is provided, which is suitably larger in comparison with the growing pot, in order to obtain an increase of the volume of water. Only one type of vessel, however, offers the possibility of a really larger water supply. This vessel is double-walled and the water supply is present between the walls. In order to prevent the supply water from running out, a wick with the function of a valve is necessary. This wick is a decisive disadvantage of this system, since it can become non-permeable by salts which crystalise out, by root growth, algae and products of decay. That is the main reason why that system can not generally be made use of. The watering of other plant arrangements is effected by sprinkling, spraying, hosing or irrigation. Watering of this kind is more or less uncontrolled and, apart from irrigation, has to be performed by human operators who either perform the hosing or turn the spraying or sprinkling installations on and off.

It is an object of the invention to provide a device for the storage and dosed delivery of liquids, in which a dosed amount of liquid is automatically supplied from a sufficiently large liquid reservoir, so that an essentially constant liquid level is maintained in an outer vessel, the liquid being available from this for its further purpose.

This object is met by a device of the kind mentioned above, which is characterised in that for the liquid supply, a tank with at least one opening for filling with liquid and for delivery of the liquid from the tank is provided, the tank being insertable into the outer vessel, the liquid in the outer vessel being in communication with an arrangement to be supplied with the liquid, in accordance with the principle of communicating vessels.

The tank may be provided with two or more openings for filling with and/or for delivery of liquid from the tank, the openings either being arranged alongside each other in the plane of the axes of the tank, or at angles to each other.

Preferably, the tank is arranged to be rotatable about an axis, at least one opening being movable from an upper non-operative position into a lower operative position.

The axis of rotation of the tank may be arranged to be parallel to or at an angle to the bottom of the outer vessel. Alternatively, a plurality of axes of rotation may be provided, which are spatially disposed as desired.

Furthermore, the tank may be rotatably mounted at a fixed position or mounted by a rolling movement arrangement.

The tank may be of cylindrical, round, oval or polygonal construction.

For the opening or the openings in the tank, in each case a closure may be provided, which automatically opens in the operative position of the tank. On the other hand, one opening or a plurality of openings may be provided with perforated masks so that they can be made smaller in size.

Furthermore, one or more liquid preparation cartridges may be arranged in or on the tank. Advantageously, such a preparation cartridge is so arranged that it can be inserted into an opening which is provided for delivery of the liquid.

An essential feature of the device of the invention, is that the same opening or the same openings which serve for filling of the tank also can be simultaneously used for the dosed delivery of the tank contents. Thus, a single opening in the tank fulfils two functions, since it acts as a charging opening when filling the tank with liquid and also as an outlet opening for the dosed delivery, that is to say it enables the discharge and emptying of the tank. With a simple non-rotatable but only removably mounted tank, after filling of this liquid, it is placed into the outer vessel in such a position that the opening of the tank is downward. In order to prevent a premature flowing out of the liquid, the opening may be provided with a valve which opens or is released after insertion of the tank into the outer vessel. With the preferred rotatably mounted construction of the tank, this remains in the outer vessel both in the non-operative and in the operative position of the tank, it being rotated so that the opening is upwards, for filling. When the filling procedure has ended, the tank is rotated through 180° or somewhat or less, so that the opening is directed downwardly and the liquid can flow out and collect on the bottom of the outer vessel. The size of the opening depends on the tank content, but in any case it is smaller relative thereto. In the working position of the tank or of the opening, liquid flows out until the height of the liquid level is such that it covers the opening, that is to say a pressure balance has been established. The vacuum existing in the tank prevents a further flowing out of the liquid.

The decisive advantage of this arrangement is that no mechanical components can interfere with the vacuum. If the vacuum is reliably constant, then no liquid can flow out of the tank and increase the amount of liquid in the outer vessel. Always, only as much liquid flows out as is determined by the distance between the floor of the outer vessel and the opening in the tank. Thus, a fundamental requirement of plant culture and more particularly of hydro-culture is satisfied, because too high a water level causes root decay and thereby the destruction of the plants.

Each feature of the liquid storage and dosed liquid delivery device according to the invention can be varied in wide limits independently of the other features. The device operates equally reliably with volumes of several thousand liters as well as in the milliliter range. Thus, the size and shape of the tank can be freely selected according to requirements.

The number of axes of rotation of the tank and their spatial arrangement can be selected as desired. The same is also true for the number, shape and size of the openings of the tank, the size of the openings depending on the desired delivery of liquid from the tank interior. Only the position of the tank openings relative to each other, even though they are variable in wide limits, is non-arbitrary, since in this case the vacuum principles has to be taken into account. Thus, a dispersal of the openings over an angle of at most 180° relative to each other is sensible. In various cases, the arrangement of two or more openings is particularly advantageous.

The following example makes this clear:

With the largest possible tank volume, of the tank which is inserted in the outer vessel, a liquid level of two centimeters in the outer vessel is to be obtained. Since there are limitations for the structural height of the tank, the space below the liquid level in the outer vessel should be used for enlarging the tank contents. In other words, the tank can extend down to the bottom of the outer vessel and nevertheless enable for example a liquid level of two centimeters. This is achieved, in that after filling of the tank, the opening(s) are not turned through 180°, but through somewhat less, so that they do not reach their deepest position but coincide with the liquid level in the outer vessel (at a height of 2 cm). In this position of the tank, the entire tank contents do not flow out, if there are not one or more further openings lying at a higher level than the first outlet opening. This illustrates the advantage of a tank with a plurality of openings arranged at different positions relative to the axis of rotation. If these openings are connected by further openings, as many as desired, the principle of operation does not change.

When filling the tank which comprises a plurality of openings arranged at an angle, there is a dead volume which cannot be filled. However, only in exceptional cases is this larger than the increase in overall volume which can be achieved, and it is usually smaller than this increase.

The tank also offers the possibility of an automatically achieved liquid preparation. This takes place with a cartridge which is filled with a substance which contains materials for the preparation of the liquid. Thus, the cartridge may for example contain softening, fertilising, feeding, germinating, colouring or other substances. Since the tank delivers the liquid slowly and always only in small amounts, for example 10 to 20 milliliters, the additives are slowly supplied and dosed into the liquid in the outer vessel.

In order to make the invention clearly understood, reference will now be made to the accompanying drawings which are given by way of example in which:

FIG. 1₁ is a diagrammatic view of an outer vessel with an inserted tank in a non-operative position, adjacent a plant container or culture pot;

FIG. 1₂ is a view corresponding to FIG. 1₁ with the tank in the operative position;

Figure 1:
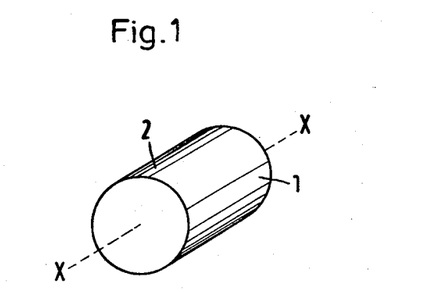
FIG. 1 is a perspective view of a cylindrical tank of a device according to the invention.

FIG. 1 shows a device according to the invention, with a tank 1 in its simplest form. This tank 1 has in its wall an opening 2 which serves simultaneously as the filling and discharge opening. The tank 1 is inserted into an outer vessel 3 adjacent the plant container or culture pot 4, so that it can be freely rotated about its axis of rotation x-x. On the other hand, as mentioned above, the tank may alternatively be constructed so as to be removable. In this case, suitable spacing pieces (not illustrated) are arranged on the floor of the outer vessel 3, on which the tank 1 is placed at an appropriate distance from the floor.

The device according to the invention will be described with reference to its use in hydroculture, since it is there that it finds a particularly advantageous and simple application.

With a tank 1 which is rotatable about an axis of rotation x-x, there may be provisions for locking the tank in two positions, namely in the non-operative position in which the opening 2 is upwards in order to be able to fill the tank 1, and in the operative position in which the opening 2 is downwards which serves for the dosing of the liquid 5.

In the operative position of the tank 1, liquid 5 flows from the tank until the level 5a in the outer vessel 3 reaches the opening 2 in the tank 1. The vacuum in the tank 1 then prevents further outflow of the liquid. As soon as the liquid supply 5 in the tank 1 has been exhausted, it is filled up again. The monitoring is extremely simple and the constant and uniform supply of plants in hydroculture is ensured. As liquid, a solution of liquid and nutrient can be used.

The tank 1 is of cylindrical construction, but any other advantageous shape suitable for the outer vessel or large vessel may be used, for example spherical, oval, angular, polygonal, or any other.

Plant container is intended to mean not only a separate container but also a region in the outer vessel 3, bordered by separating walls (not shown) for reception of the plants. Only of importance in this respect, is the communicating connection between the tank region or the liquid region fed from the tank, and the container or containers in which a uniform liquid supply is required.

Figure 1A:
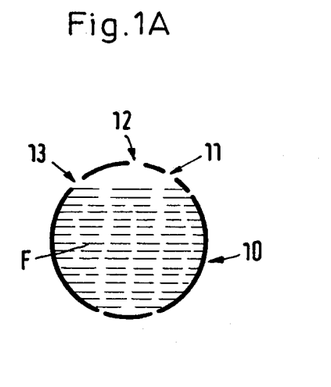
FIG. 1A is an end view of a cylindrical tank with three openings, in the non-operative position.
Figure 1B:
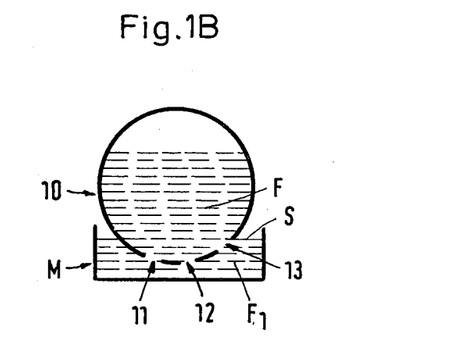
FIG. 1B is an end view of the tank according to FIG. 1A, inserted into an outer container, in an operative position.

The embodiment of a cylindrical tank 10 shows in FIG. 1A comprises 3 openings, 11, 12 and 13 arranged at an angle to each other, which are directed upwardly in the non-operative position. In this position, the tank is filled with the liquid F through one of the openings 11, 12 or 13. The filling height of the tank depends on the lowest lying opening 13. The tank 10 filled in this way, is inserted in a large or outer vessel M and is mounted rotatably therein and can be turned into its working position (FIG. 1B). Liquid $F_1$ has already been charged into the outer vessel M up to a predetermined height, or sufficient liquid flows from the tank 10 after rotation of it into the operative position, until the liquid level S completely covers the highest disposed opening 13 in the tank 10. The vacuum in the tank 10 then prevents further flowing out of the liquid. The liquid level S in the outer vessel M thus depends on the highest disposed opening 13 in the tank. As soon as this liquid level S drops, a corresponding amount of liquid flows out of the tank 10, namely so much that the highest disposed opening 13 is always covered. When the liquid supply in the tank 10 is exhausted, it is refilled. In this manner it is achieved that, for example, in a hydroculture system, a constant and uniform supply to the plants can be ensured, or a roller can be uniformly wetted.

Figure 1C:
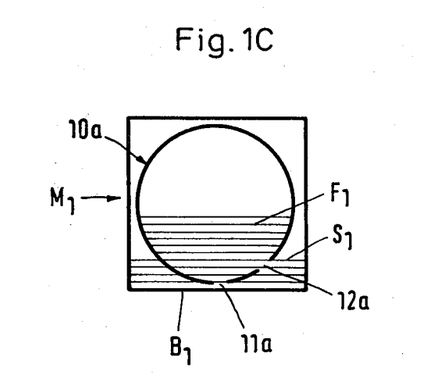
FIG. 1C is a view similar to FIG. 1B, showing a tank with two openings.

FIG. 1C shows a tank 10a with two openings 11a and 12a arranged at an angle to each other. This arrangement, and also the other arrangement according to FIG. 1A, is suitable for tanks with limited structural height, since in an advantageous manner for enlargement of the tank volume, also the region below the liquid level $S_1$ in the outer vessel $M_1$ can be made use of. In this case, the tank is inserted into the outer vessel $M_1$ so that the tank wall tangentially engages the floor $B_1$ of the outer vessel.

The tank 10a is rotated out of the non-operative or filling position into the operative position, not through 180° but through a few degrees less, so that one opening 11a comes to lie directly over the floor $B_1$ of the outer vessel $M_1$, whereas the other opening 12a lies at a spacing above the floor $B_1$. Firstly, the liquid flows out of this higher disposed opening 12a. When the liquid supply $F_1$ in the tank 10a has reached the higher position opening 12a, and has freed it during the flowing out, the liquid level $S_1$ in the outer vessel $M_1$ drops. Then the lower opening 11a serves for allowing the remainder of liquid to flow from the tank 10a. The second opening thus enables complete emptying of the tank 10a.

By the arrangement of openings lying at an angular position relative to each other, the height of the charge in the tank is reduced, but a noticeably increased tank content can nevertheless be provided.

Figure 2:
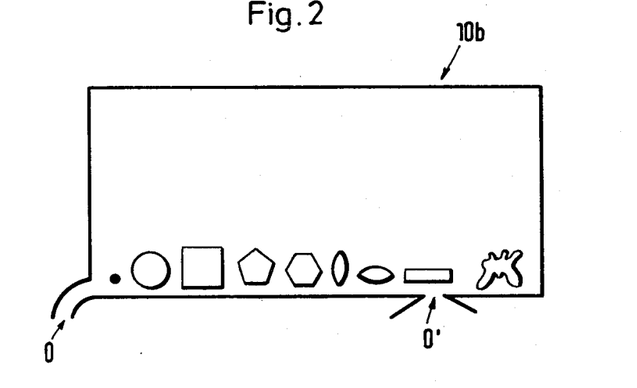
FIG. 2 is a side view of a cylindrical tank, in which various shapes of openings are illustrated by way of example.

The diagrammatic illustration of the tank 10b in FIG. 2, simply shows a number of different forms of the openings in the tank, which can readily be provided with outlet attachments such as shown for the opening 0 at the end and the opening O' on the tank wall.

Figure 3:
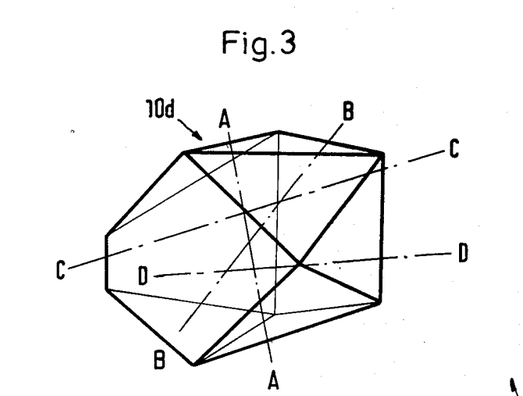
FIG. 3 is a perspective view of a tank of polyhedral construction, with various possibilities of arrangement of axes of rotation.

The tank itself can be constructed in many different shapes. Thus, for example, in FIG. 3 a tank 10d is illustrated of polyhedral shape, possible axes of rotation A—A, B—B, C—C and D—D being shown, about which the tank can be rotatably mounted singly or in combination.

Figure 4:
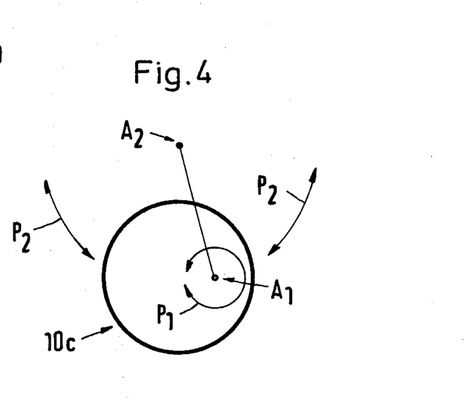
FIG. 4 is an end view of a cylindrical tank with two eccentric axes of rotation, illustrated diagrammatically.

FIG. 4 illustrates an end view of a cylindrical tank 10c, which for example is rotatably mounted about 2 eccentrically arranged axes $A_1$ and $A_2$. The arrows $P_1$ and $P_2$ clarify the rotary movements of the tank 10c.

Figure 5:
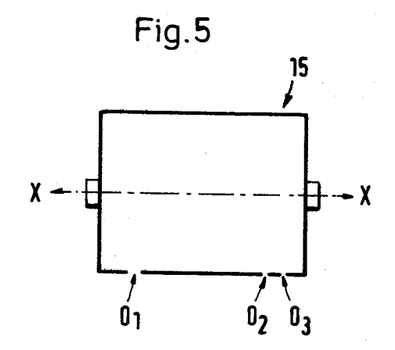
FIGS. 5, 6 and 7 illustrate three different possibilities of the rotary mounting of the tank.
Figure 6:
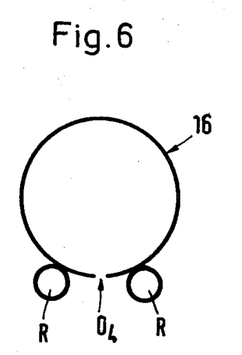
Figure 7:
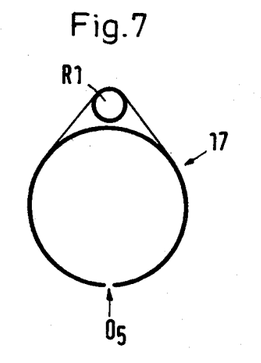

Further possibilities of the rotatable mounting of a tank suitable for the purpose of the invention, illustrated in FIGS. 5, 6 and 7.

The tank 15 (FIG. 5) is rotatably mounted about its axis x-x. This is the simplest form of the mounting. The tank 15 is provided with three openings $O_1$, $O_2$ and $O_3$.

The tank 16 is shown in end view in FIG. 6. It lies on rollers R and can be rotated on these. With this tank example, an opening $O_4$ is provided.

The tank 17 (FIG. 7) is for example rotatably suspended on a roller R1 arranged outside the tank wall. This tank 17 has an opening $O_5$. This kind of suspension is of interest if a large tank content and the thereby occuring vacuum would lead to deformation of the tank. In this respect, the suspension acts as a kind of corset.

For large tanks, a motordrive can be provided without any problems.

Figure 8:
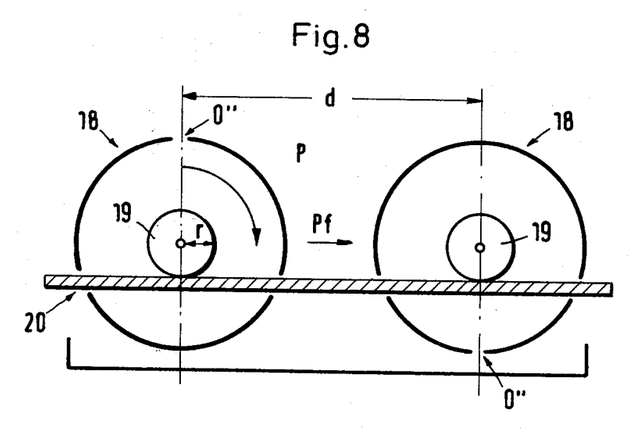
FIG. 8 is a diagrammatic end view of a further possibility of rotatable mounting of a tank, in which the rotation is combined with a translatory movement.

Another possibility of rotating the tank is shown in FIG. 8, in which the rotary movement is combined with a rolling movement. In this case, the tank can be subjected to a rolling movement and thus rotated, on a flat or inclined plane or in the horizontal or vertical directions.

In the embodiment according to FIG. 8, a wheel 19 is fixed at each end of a tank 18. Since in the figure only the end of the tank 18 is illustrated, only one wheel 19 can be seen.

The two wheels form the ends of the tank shaft and each wheel 19 is seated on a rail 20 on which it can roll. In the filling or non-operative position, the opening O" of the tank 18 is upwardly directed (left hand in FIG. 8). If the tank 18 is rotated in the direction of the arrow P, the wheels 19 roll on the rails 20 in the direction of the arrow Pf. After $1\frac{1}{2}$ revolutions, from the filling into the operative position (right hand side in FIG. 8), the tank 18 has shifted back through the path d, the opening O" then having reached its deepest position. The length of the movement path d depends on the desired operative position of the opening O", which, as described above, does not always have to correspond to a rotation of the tank through 180°. The movement path d can thus be shorter, it can also be longer, although any elongation must correspond always to a complete revolution or a complete rotation of the tank.

It is very simple to provide closing devices as sealing arrangements for the openings of the tank, which open only when the operative position is reached. Such closures have the advantage that on rotating the tank none of the tank contents, or only very little, flows out. The sealing arrangements do not need to be very accurate since they are only required and only come into operation during the rotation of the tank. The closure is thus required only for a short time during the rotation, since the proper and extremely reliable closure makes use of the vacuum principle. The closures have the advantage that the charging openings can be made sufficiently large to enable a rapid filling of the tank, but on the other hand ensure that an rotating the tank, practically no liquid flows out.

Figure 9:
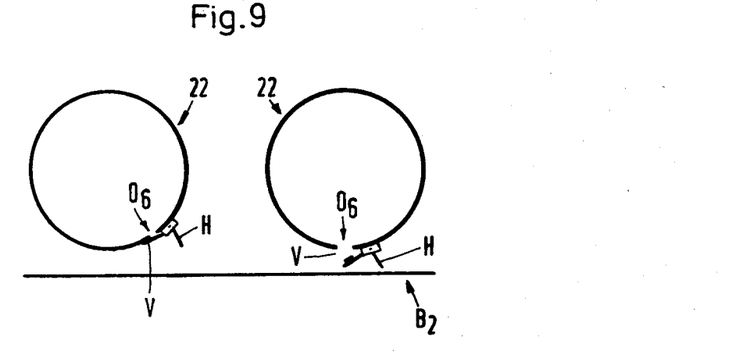
FIG. 9 is an end view of a cylindrical tank with a flap-like closure for an opening.
Figure 10:
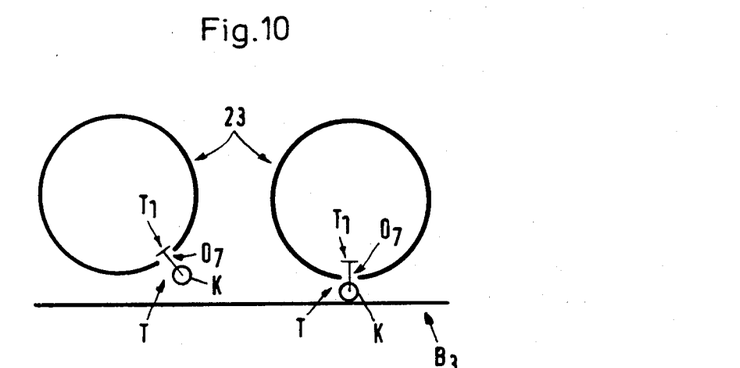
FIG. 10 is an end view of a cylindrical tank with a T-shaped closure for an opening.
Figure 11:
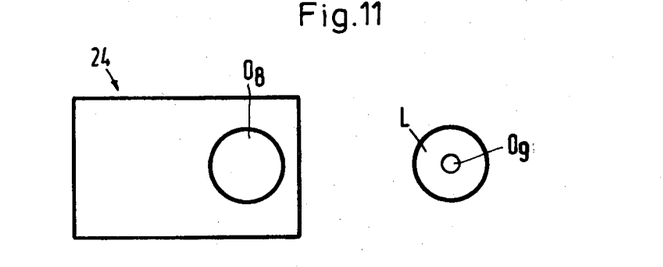
FIG. 11 is an end view of a cylindrical tank with a larger opening for easy filling of the tank, and with a perforated mask provided for the opening.

FIGS. 9, 10 and 11 illustrated three examples of closures.

The opening $O_6$ of the tank 22 (FIG. 9) is closed from the outside by a flap-valve V, which is provided with an outwardly extending and sidewardly directed lever H. As soon as the lever H contacts the floor $B_2$ of the outer vessel (not illustrated) during the rotary movement of the tank 22, the movement of the lever is blocked, that is to say it can no longer participate in the rotation, and it consequently pulls the flap-valve V away from the opening $O_6$, so that this is freed.

The opening $O_7$ of the tank 23 (FIG. 10) is covered by a T-shaped closure 7. The transverse part $T_1$ of the T closure, closes the opening $O_7$ from the inside. At the free end of the T-stem which extends through the opening $O_7$, a ball K or the like is arranged, which draws the transverse part $T_1$ in the outward direction under the action of gravity, on to the seat formed by the margin of the opening $O_7$. When the ball K contacts the floor $B_3$ of the outer vessel (not illustrated), the T closure is pressed upwardly and the transverse part $T_1$ is lifted from the seat, so that the opening $O_7$ is freed.

Instead of a proper closure, a perforated mask L may be provided, which has a smaller opening $O_9$ (FIG. 11). In the tank 24, a relatively large filling opening $O_8$ is cut, which is provided with the apertured mask L. After filling, this is pushed, snapped or simply plugged on to the opening $O_8$. In this manner, the filling through the larger opening $O_8$ is facilitated, whereas the smaller opening $O_9$ required for the dosed delivery is provided by the apertured mask L. On the other hand, the mask may be simply in the form of a plate which is slid over a part of the opening $O_8$.

Figure 12:
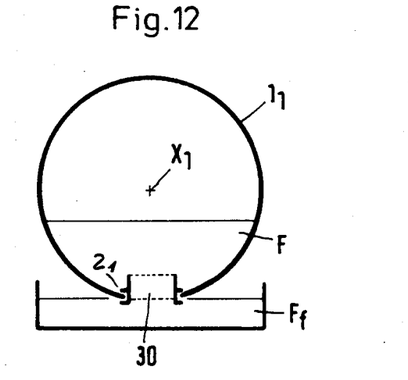
FIG. 12 is a diagrammatic end view of a tank with a liquid preparation cartridge insertable into an opening, the cartridge extending into the tank interior.
Figure 13:
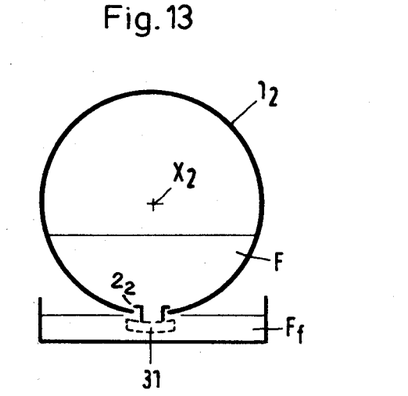
FIG. 13 is a diagrammatic end view of a tank with a liquid preparation cartridge insertable into an opening so as to be outwardly directed.

FIGS. 12 and 13 show two possibilities of the arrangement of a liquid preparation cartridge 30 or 31, which is filled with a substance which serves for treating the liquid itself or as an additive for the plants to be treated by the liquid or water.

In FIG. 12, the cartridge 30 is inserted in an opening $2_1$ of a tank $1_1$ which is rotatable about the axis $x_1$, so that its preparation charge extends into the interior of the tank, that is to say into the liquid F present in the tank.

In FIG. 13, the cartridge 31 is inserted in an opening $2_2$ of a tank $1_1$ rotatable about the axis $x_2$, so that the preparation charge projects beyond the tank wall and dips into the liquid $F_f$ present in the outer vessel $M_m$, in the working position of the tank or of the opening $2_2$.

As already mentioned, such a liquid preparation cartridge can be filled with various active substances. If for example plants have to be provided with softened water, the cartridge 30 or 31 may be filled with a suitable ion exchanger and inserted. There is nothing further to do, and the installation can be left to itself. Since during the operation of the device, the liquid or the water only passes slowly through the cartridge charge, the required ion exchange is carried out. If the tank delivers quantities of 10 to 20 milliliters, the cartridge is accurately predetermined for these volumes. The residence time of the water in the cartridge is very long and accordingly the ion exchange is quantitatively substantially complete. Thus, completely softened water is provided, before the cartridge is again refilled with hard water from the tank. The same is true for other additives in the cartridge, which owing to the slow through-put, are leached out and supplied in desired proportions to the water.

The place where the liquid preparation cartridge is fixed, depends on the required object, that is to say the kind of cartridge and its action. There are various fixing possibilities in addition to the illustrated positions on the tank. These possibilities depend also on the number of openings in the tank.

It is possible for an indicating device (not illustrated) to be provided for showing the liquid condition in the tank interior, so that the tank charge can be readily monitored at any time.

I claim:

1. A hydroculture, soilless plant watering system comprising a plant container or culture pot filled only with an inert granular substrate;
    an outer vessel containing said plant container;
    a water supply container situated in said outer vessel, said water container designed for the storage and dosed delivery of water including means to maintain a pre-determined and variable discharge water level in said outer vessel, said water supply container comprising a tank rotatably mounted about at least one axis of said tank and having at least one opening rotatable from an upper filling or non-operating position to a lower discharge or operating position, the degree of rotation determinate of the desired water level in said outer vessel; and
    a nutrient supply affixed in on or adjacent said tank.

2. A plant watering system as claimed in claim 1 wherein said nutrient substance is an ion exchange material.

3. A plant watering system as claimed in claim 1, wherein at least one cartridge is inserted in at least one opening of the tank so that the nutrient substance extends into the water in the tank interior.

4. A plant watering system as claimed in claim 1, wherein at least one cartridge is inserted into at least one opening of the tank so that the nutrient substance extends into the liquid in the outer vessel.

5. A plant watering system as claimed in claim 1, wherein said tank has two or more openings for filling and discharge of water, the openings being arranged along a line parallel to an axis of the tank.

6. A plant watering system as claimed in claim 1, wherein said tank has two or more openings for filling and discharge of water, the openings being arranged along a line at an angle to an axis of the tank.

7. A plant watering system as claimed in claim 1, wherein the axis or axes of rotation of the tank are arranged parallel to the bottom of the outer vessel.

8. A plant watering system as claimed in claim 1, wherein the axis or axes of rotation of the tank are arranged at an angle to the bottom of the outer vessel.

* * * * *